US008739620B1

(12) United States Patent
Haberbusch et al.

(10) Patent No.: US 8,739,620 B1
(45) Date of Patent: Jun. 3, 2014

(54) LIQUID-SENSING PROBE AND METHODS FOR USING THE SAME

(75) Inventors: Mark S. Haberbusch, Amherst, OH (US); Jacob C. Ickes, Fremont, OH (US); Adam Thurn, Clyde, OH (US); Branden J. Lawless, Mason, OH (US)

(73) Assignee: Sierra Lobo, Inc., Fremont, OH (US)

( * ) Notice: Subject to any disclaimer, the term of this patent is extended or adjusted under 35 U.S.C. 154(b) by 889 days.

(21) Appl. No.: 12/860,394

(22) Filed: Aug. 20, 2010

Related U.S. Application Data

(60) Provisional application No. 61/274,741, filed on Aug. 20, 2009.

(51) Int. Cl.
*G01F 23/00* (2006.01)
(52) U.S. Cl.
USPC ............................................ 73/295; 73/290 R
(58) Field of Classification Search
USPC ................................................ 73/290 R, 295
See application file for complete search history.

(56) References Cited

U.S. PATENT DOCUMENTS

| | | | |
|---|---|---|---|
| 3,465,587 A | 9/1969 | Pierce | |
| 3,734,123 A | 5/1973 | Pomerantz | |
| 3,755,801 A | 8/1973 | Milo | |
| 4,949,069 A | 8/1990 | Wilson | |
| 5,209,115 A * | 5/1993 | Bond | 73/295 |
| 5,687,607 A * | 11/1997 | Brandt et al. | 73/290 R |
| 6,305,219 B1 * | 10/2001 | Bentz et al. | 73/290 V |
| 6,431,750 B1 | 8/2002 | Haberbusch et al. | |
| 6,571,624 B1 | 6/2003 | Grayson et al. | |
| 7,392,691 B1 | 7/2008 | Yeckley | |

OTHER PUBLICATIONS

Ahmed, N., Fluid Mechanics, Engineering Press, Inc., San Jose, CA, 1987, pp. 24-28.
Berns, J.A., Yeh, F.C. and Nussle, R.C., "Photographic Investigation of Liquid Behavior on Temperature and Liquid-Vapor Sensors Used in Low-Gravity Environment," NASA Technical Memorandum X-1438, Sep. 1967.
Clodfelter, R.G., "Fluid Mechanics and Tankage Design for Low Gravity Environment," Air Force Aero-Propulsion Laboratory, Technical Documentary Report No. ASD-TDR-63-506, Sep. 1963.
Dempsey, P.J. and Fabik, R.H., "Using Silicon Diodes for Detecting the Liquid-Vapor Interface in Hydrogen," NASA Technical Memorandum 105541, 1992.

(Continued)

*Primary Examiner* — Hezron E Williams
*Assistant Examiner* — David Z Huang
(74) *Attorney, Agent, or Firm* — Pearne & Gordon LLP

(57) ABSTRACT

A sensor assembly includes a main body, a sensor, and a filler. The main body includes an outer surface having a continuously-variable radius of curvature in at least one portion. A sensor in thermal communication with a region of that surface having relatively low radius of curvature is disposed in the assembly recessed from the outer surface. Liquid droplets adhered to the outer surface in this region tend to migrate to a distant location having a higher radius of curvature. The main body has low thermal conductivity. The filler has a relatively higher thermal conductivity and, in embodiments, fills an opening in the outer surface of the main body, providing a thermally-conductive pathway between the sensor and the surrounding environment via the opening. A probe having a plurality of such sensors, and methods of detecting the presence of liquid and phase transitions in a predetermined space are also disclosed.

27 Claims, 6 Drawing Sheets

(56) References Cited

OTHER PUBLICATIONS

Edwards, L.G., "Cryogenic On-Orbit Liquid Depot Storage Acquisition and Transfer (COLD-SAT) Experiment Subsystem Instrumentation and Wire Harness Design Report," NASA Contractor Report 189172, Mar. 1994.

Haberbusch, M.S. and Bryant, C.B., "Liquid Hydrogen Testing of an Ultra-Light Flexible Temperature and Liquid Level Sensing Probe," Proceedings of the 48th International Instrumentation Symposium, San Diego, CA, 2002.

Haberbusch, M.S., Culler, A.J., DePhillips, T.P, Nguyen, C.T., Skaff, A.F. and Yeckley, A.J., "A Cryogenic Lightweight Mass Gauging System for Expendable and Reusable Launch Vehicles," AIAA 2002-3598, Proceedings of the 38th AIAA/ASME/SAE/ASEE Joint Propulsion Conference, Indianapolis, IN, Jul. 7-10, 2002.

Haberbusch, M.S., Ickes, J.C., Lawless, B.J. and Walls, L.K., "Reduced Gravity Cryo-Tracker System," AIAA 2009-1599, 47th AIAA Aerospace Sciences Meeting, Orlando, FL, Jan. 5-8, 2009.

Hunter Products, Inc., "Ostalloy 158," from www.hunterproducts.com/ostalloy.html, Jul. 21, 2009.

Kramer, E. (ed.), "Cryogenic On-Orbit Liquid Depot-Storage, Acquisition and Transfer (COLD-SAT) Experiment Conceptual Design and Feasibility Study," NASA Technical Paper 3523, Dec. 1998.

Lacovic, R.F., Yeh, F.C., Szabo, Jr., S.V., Brun, R.J., Stofan, A.J. and Berns, J.A., "Management of Cryogenic Propellants in a Full-Scale Orbiting Space Vehicle," NASA Technical Note D-4571, May 1968.

Monti, R. (ed.), Earth Space Institute Book Series vol. 7: Physics of Fluids in Microgravity, Taylor & Francis, New York, NY, 2001, Chapters 1-3.

Petrash, D.A., Nussle, R.C. and Otto, E.W., "Effect of Contact Angle and Tank Geometry on the Configuration of the Liquid-Vapor Interface during Weightlessness," NASA Technical Note D-2075, Oct. 1963.

Reynolds, W.C., Saad, M.A. and Satterlee, H.M., "Capillary Hydrostatics and Hydrodynamics at Low g," Stanford University Mechanical Engineering Department, Technical Report No. LG-3, Sep. 1, 1964.

Schieb, D.J., Haberbusch, M.S. and Yeckley, A.J., "Cryo-Tracker Mass Gauging System Testing in a Launch Vehicle Simulation," Cryogenic Engineering: Transactions of the Cryogenic Engineering Conference, CEC—vol. 51, Keystone, CO, Aug. 2005.

Schieb, D.J., Haberbusch, M.S. and Yeckley, A.J., "Cryo-Tracker Mass Gauging System Testing in a Large-Scale Expendable Launch Vehicle LOX Tank Simulator," SPIE Defense & Security Symposium, Orlando, FL, Apr. 20, 2006.

Siegwarth, J.D., Voth, R.O. and Snyder, S.M., "Liquid-Vapour Surface Sensors for Liquid Nitrogen and Hydrogen," Cryogenics, vol. 32, No. 2, 1992, pp. 236-242.

Sierra Lobo, Inc., "Cryo-Tracker Level, Temperature, and Mass Gauging Fluid Sensors," from www.sierralobo.com, Aug. 21, 2003.

Solvay Advanced Polymers, LLC, "Torlon Polyamide-imide Design Guide," Alpharetta, GA, Aug. 2003.

Staff of the Lewis Research Center, "Postflight Evaluation of Atlas-Centaur AC-4 (Launched Dec. 11, 1964)," NASA Technical Memorandum X-1108, Jul. 1965.

\* cited by examiner

LIQUID-SENSING PROBE AND METHODS FOR USING THE SAME

CROSS-REFERENCE TO RELATED APPLICATIONS

This application claims the benefit of U.S. Provisional Application No. 61/274,741, filed Aug. 20, 2009, the entire disclosure of which is incorporated herein by reference.

STATEMENT OF GOVERNMENT-SPONSORED RESEARCH

This invention was made with government support under Contract No. NNK07EA71C awarded by NASA. The government has certain rights in this invention.

FIELD OF THE INVENTION

This disclosure relates generally to sensor assemblies, and more particularly, to sensor assemblies for detecting the presence of liquid and methods of using such assemblies.

BACKGROUND OF THE INVENTION

Containers for storing liquids can be equipped with sensors for detecting the presence of liquid therein. Some of these sensors operate by determining whether liquid is in contact with a designated sensor, or a portion thereof. However, there is a possibility of false positive indication due to droplets of the liquid that adhere to or remain in contact with the sensor even though the bulk of the liquid is out of the container or has receded from the sensor location in the container. Systems and methods are desirable to ensure that droplets do not remain in contact with sensors (or the portion thereof responsible for liquid detection), or at least to minimize the duration of such contact after the bulk liquid has receded or been removed from the sensor location within the container.

BRIEF SUMMARY OF THE INVENTION

A sensor assembly is provided. The assembly includes a main body that has an outer surface at least a portion of which is curved such that its radius of curvature increases from a first location on the outer surface to a second location on the outer surface. A sensor is recessed in the main body beneath the outer surface. A conductive pathway is provided between the sensor and an environment outside the main body adjacent the first location. The conductive pathway has a thermal conductivity greater than the thermal conductivity of the main body.

A probe is also provided, which includes a support strip having at least one conductor extending therein along the probe's length, and a sensor assembly as described in the preceding paragraph.

A method of detecting whether liquid is present in a predetermined space is also provided. The method includes the steps of: exposing the main body of a sensor assembly having a sensor and a thermal pathway communicating between the sensor and any exterior surface of the main body, to the predetermined space; applying a current to the sensor to generate heat at the sensor, wherein heat generated at said sensor is dissipated via the conductive pathway to the predetermined space; and detecting the voltage drop across said sensor as a function of time and correlating voltage drop-versus-time data for said sensor with the rate of dissipation of said heat to determine the presence or absence of liquid in the predetermined space.

A method of detecting a vapor-to-liquid or a liquid-to-vapor transition in a predetermined space is also provided. The method includes the steps of: placing a sensor in thermal communication with the predetermined space; detecting a signal from the sensor as a function of time, wherein the signal is variable with a characteristic of the sensor that relates to a thermal mass in the predetermined space as a result of the thermal communication between the sensor and that space; and calculating a first derivative of time-dependent data derived from the signal, and correlating a peak in the first derivative with a phase transition in the predetermined space.

A further method of detecting a vapor-to-liquid or a liquid-to-vapor transition in a predetermined space is also provided. The method comprises the following steps: placing a sensor in thermal communication with the predetermined space; applying a current to the sensor to generate heat at the sensor; monitoring a voltage drop across the sensor as a function of time, based on the sensor's temperature; and calculating a first derivative of the voltage drop across the sensor as a function of time, and correlating a peak in the first derivative with a phase transition in the predetermined space.

DESCRIPTION OF EXAMPLE EMBODIMENTS

Figure 1A:
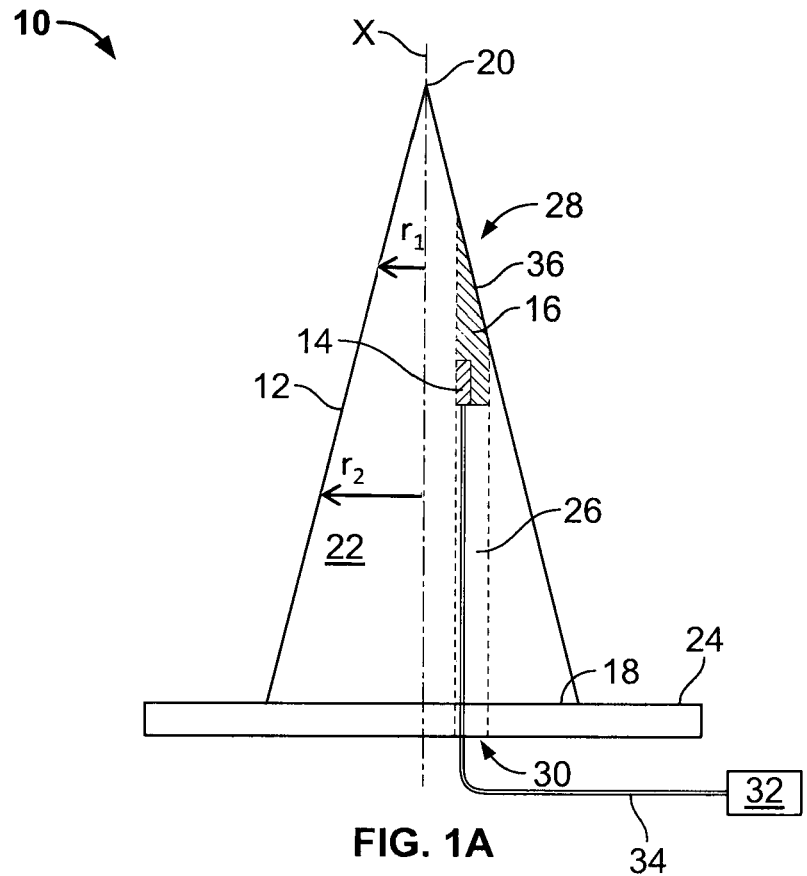
FIG. 1A is a side view, partially in section, of an exemplary sensor assembly as disclosed herein.
Figure 1B:
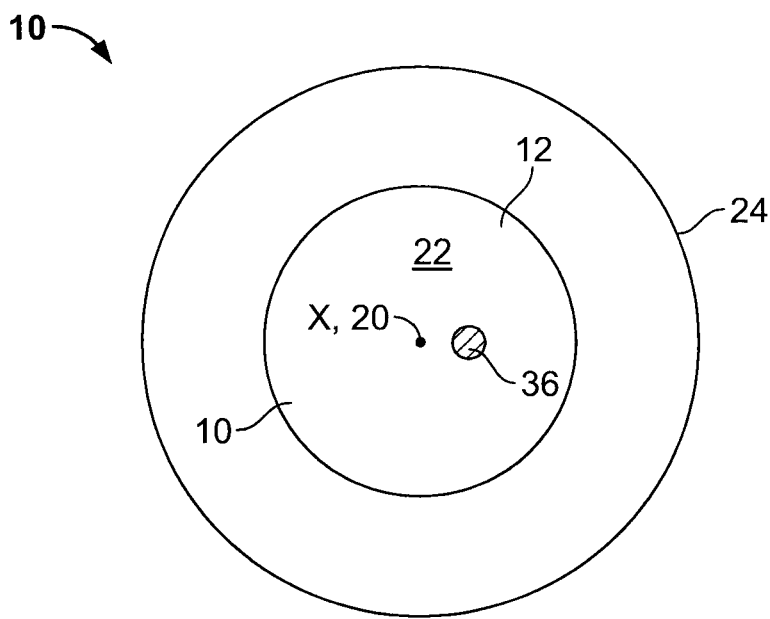
FIG. 1B is a top view of the sensor assembly of FIG. 1A.
Figure 1C:
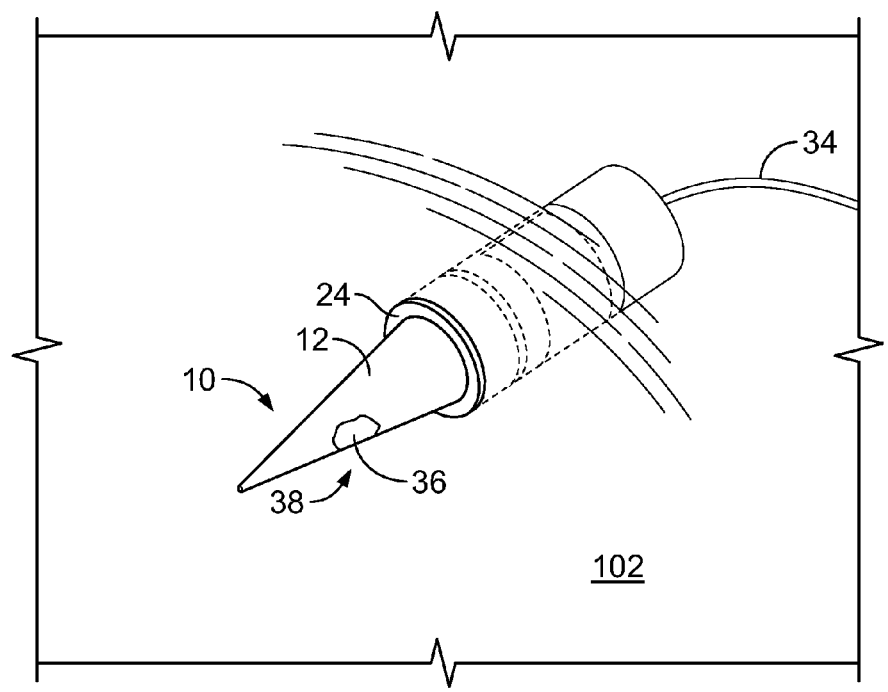
FIG. 1C is a perspective view of the sensor assembly of FIG. 1A mounted on a wall-like structure.

Referring to FIGS. 1A-1C, a liquid sensing probe in the form of a sensor assembly 10 that can be used to indicate presence or quantity of liquid inside a container, e.g. in a reduced-gravity environment, is shown. A reduced-gravity environment may be a state of zero gravity, or nominal (micro) gravity as may be experienced in Earth orbit. The sensor assembly 10 described herein can be used to detect the presence of liquid, or a liquid-vapor interface, for a variety of liquids and liquid-gas systems. One desirable application is the detection of liquids in reduced gravity (or microgravity) or zero gravity environments. Still further, it is desirable to detect cryogenic liquids in such environments.

In the illustrated embodiment, the sensor assembly 10 includes a main body 12, a sensor 14 and a filler 16. The main body 12 preferably is made of a non-conductive material. Herein, "non-conductive" means a material having a thermal conductivity of not more than 4 W/m-K. Preferably, a non-conductive material has a thermal conductivity not more than 2 W/m-K, more preferably not more than 1 W/m-K. The main body 12 has a curved outer surface 22 having a variable radius of curvature at least in a portion thereof. The sensor 14 is recessed in the main body 12 through a first opening 28 in the outer surface 22, so that the sensor is close to but does not protrude above the outer surface 22. The sensor 14 can reside, for example, in a bore 26 drilled or provided through the main body 12, which is otherwise preferably solid. The sensor can be held in place via suitable adhesive, such as epoxy adhesive. The filler 16, which is preferably conductive, fills the opening 28 so as to form essentially a continuation of the outer surface 22 over the opening 28, and is in direct thermal contact with the sensor 14. This is more fully explained below. In the case of a conical main body 12 as illustrated, the sensor 14 can be disposed at substantially any axial location so long as it is not located at or substantially in the region of the outer surface 22 having the maximum radius of curvature. This is because, as explained below, liquid droplets that may adhere to the outer surface 22, or to the portion thereof where the sensor 14 is located, will tend to migrate away therefrom toward a region of larger radius of curvature. If the sensor 14 is already located at or substantially in the region having the largest radius of curvature, there will be nowhere for retained liquid droplets to migrate away from the sensor 14.

The main body in the illustrated embodiment is cone-shaped and includes a base 18 at one end and a tip 20 at the other longitudinal end such that the radius of curvature for outer surface 22 is largest at the base 18 and decreases therefrom toward the tip 20 along a longitudinal axis X. The outer surface 22 can be an entirely curved surface without a flat area. When the main body 12 is a cone as in the illustrated embodiment, the outer surface 22 is a conical surface having no flat area. Alternatively, the main body 12 may be embodied in various other three-dimensional shapes so long as the shape possesses a outer surface having a variable radius of curvature over at least a portion thereof. In a further alternative, the main body 12 may be generally cone-shaped, but having a truncated terminal portion instead of the tip 20 as illustrated, which will result in a frustoconical outer surface 22. In still a further alternative, a cone-shaped main body 12 may terminate in a rounded tip 20 instead of the sharp tip that is illustrated. It is to be understood that as used herein and in the claims, the term "conical" refers to an outer surface based on any of the above shapes; i.e. a true cone having either a pointed or rounded tip (or any other-shaped tip), a frustum (which is a cone that has been truncated via an intersecting plane), and any other sort of truncated cone, wherein some portion of the surface of a true cone has been removed or is not present, but the outer surface that is present is curved such that it defines a cone geometrically. Still other shapes having variable radius of curvature outer surfaces are contemplated, including, e.g., ellipsoids, paraboloids, and shapes having outer surfaces that are not completely curved, but which may include flat portions and curved portions, with at least one curved portion having a variable radius of curvature.

Indeed, there is practically no limit on the overall shape of the main body 12 of sensor assembly 10, so long as the body 12 possesses a outer surface that has a variable radius of curvature over at least a portion of that surface, so that its radius of curvature increases continuously from a first position where the sensor 14 is positioned, or with which the sensor is in thermal communication (e.g. via a conductive pathway such as filler 16) to a second position that is a distance from the first position. In this manner, liquid droplets will tend to migrate from the first position to the second position based on the continuously-variable radius of curvature increasing from the first position to the second position, as a result of surface-tension effects.

A cone is a desirable shape for the main body 12 because it is a common shape that is simple to manufacture, and it has an outer surface having continuously variable-radius that varies in an axial direction of the main body 12. Because the entire outer surface 22 of a cone-shaped main body 12 is continuously variable along the longitudinal axis, a cone provides some flexibility in placement of the sensor 14, so long as it is placed sufficiently distant from the base so there remains a substantial portion of curved surface having a larger radius of curvature to enable liquid droplets to migrate away from the sensor location. Additionally, the inventors believe that the smaller the cone angle (and consequently the smaller the rate of change in the radius of curvature between the sensor location and a remote location to which droplets will migrate), the stronger will be the tendency for liquid droplets in the low-radius region in the vicinity of the sensor to migrate toward the large-radius region due to surface-tension effects. As used herein, the term "cone angle" refers to the angle between the longitudinal axis of a cone and a line in the cone's outer (conic) surface. In embodiments, the cone angle is not more than 20°, more preferably not more than 15°, more preferably not more than 10°. In an exemplary embodiment, the cone angle is about 8.66°.

In FIGS. 1A-B, the main body 12 includes an outwardly protruding flange 24 at the base 18 that may be an integral part of the main body 12. In the illustrated embodiment, the main body 12 has a bore 26 that extends therethrough from the base 18 parallel to the longitudinal axis X, and terminates at the first opening 28 in the outer surface 22. The bore 26 is open to a second opening 30 in the base 18. In the illustrated embodiment, the bore 26 is substantially straight and oriented parallel but offset relative to the longitudinal axis X of the main body 12. However, the bore 26 may also be coaxial with or oriented at an angle relative to the longitudinal axis X, or it may be curved or have a bend.

A sensor 14 is positioned within the main body 12, recessed below the outer surface 22 but in thermal communication with an environment immediately above that surface 22 via a conductive material, such as filler 16. Preferably, the sensor 14 is positioned inside the bore 26 adjacent the first opening 28, but recessed below the outer surface 22 within the bore 26 so as to not protrude above the outer surface 22, which would affect the outer contour of the main body 12. The sensor 14 can be positioned so that it is located just beneath a continuation of the curved outer surface, possessing a continuous contour therewith, were that surface to extend over the opening 28. The sensor 14 may be a temperature-sensing diode, such as model DT421 from Lakeshore, and more particularly, a silicon diode. An example of such a diode is disclosed in U.S. Pat. No. 6,431,750, which is incorporated herein by reference. During operation as explained more fully below, the sensor 14 (e.g. temperature-sensing diode) is in electrical communication with a processing apparatus 32 (such as a computer, a digital readout or other display), which may be located distant from and external to the sensor assembly 10 and to which data from sensor 14 is output. Wires 34 for such electrical communication may be routed through the bore 26 via the first and second openings 28 and 30 as illustrated in FIG. 1. While the sensor 14 is preferably located adjacent the first opening 28 as mentioned above, it may be located anywhere within the bore 26.

The sensor 14 preferably is covered over and the first opening 28 filled in with a filler 16 made of thermally conductive material that will transmit thermal energy between the sensor 14 and the outer environment adjacent the main body 12 above the first opening 28. The filler 16 fills at least a portion of the bore 26 between the first opening 28 and the sensor 14. The filler 16 is made of material having high thermal conductivity that is preferably at least 10 W/m-K, more preferably 12, 14, 16 or 18, W/m-K. In a desirable embodiment the thermal conductivity of the filler 16 is at least one order of magnitude greater than the thermal conductivity of the main body 12. The filler 16 contacts the sensor 14 so as to be in a thermally conductive communication therewith. The exposed portion 36 of the filler 16 closes the first opening 28 of the bore 26 and is in thermal communication with the environment above said opening 28, which the sensor 14 is intended to examine. Thus, it will be appreciated that the filler 16 provides a thermally-conductive pathway between the sensor and the environment outside the main body 12 adjacent the opening 28.

The exposed portion 36 of the filler 16 is preferably shaped to provide a continuous contour with, and to match seamlessly a curvature of, the outer surface 22, such that the exposed portion 36 of the filler 16 substantially forms a continuous part of the outer surface 22 of the main body for the sensor assembly. It is desirable that the interface between the exposed portion 36 of the conductive filler 16 (over the sensor 14) and the curved outer surface 22 of the main body 12 be seamless, or as seamless as practical. This is significant because imperfections or discontinuities at that interface can provide nucleation sites for the nucleation and retention of liquid droplets that may counteract the surface-tension induced migration of those droplets away from the sensor 14 to a region of the outer surface 22 of the main body 12 having higher radius of curvature. In order to counter these occurrences, preferably the exposed portion 36 is formed, e.g. via machining or sanding, so as to present substantially no imperfection, such as a groove, a protrusion or an indentation, at the interface (FIG. 1C) between the outer surface 22 surrounding the first opening 28 and the exposed portion 36 of the filler 16 that fills that opening. Alternatively, the conductive filler 16 can be a machined plug that is shaped to fill the first opening 28 over the diode 14 and which has an outer surface (i.e., the exposed portion 36) machined to match the surface contour of the curved outer surface 22 of the main body 12, and to provide a seamless interface therewith. Surface treatment of this interface, for example by way of sanding, may be necessary to eliminate imperfections and achieve the desired curvature. In an alternative embodiment, the diode 14 can be custom manufactured so that it is shaped to fit into the first opening 28 and has an outer surface that itself provides continuity with the curved outer surface 22 of the main body 12. In this embodiment, no separate conducting filler 16 would be required to produce a substantially seamless surface in the vicinity of the first opening 28.

The presence or absence of liquid in the vicinity of the main body 12 above the sensor 14 (and opening/filler 28/16) is determined based on how quickly thermal energy generated by applying a voltage to the diode 14 is dissipated. If liquid is in thermal contact with the sensor 14 via a conductive pathway (i.e. in contact with the exposed portion 36 of the conductive filler 16 above the sensor 14), then thermal energy generated by applying a voltage to the diode 14 will dissipate more rapidly compared to if no liquid is in such contact. The non-conductive body 12 is made of a non-conductive material and therefore has low thermal mass. This ensures that thermal energy is not dissipated to a great extent into that body 12 itself. Instead, the dissipation of thermal energy generated at the sensor 14 (e.g. diode) is concentrated along a conductive pathway through the filler 16, including its exposed portion 36 in contact with the environment, and the rate of thermal-energy dissipation depends on whether there is a thermal sink in contact with the conductive pathway (e.g. the filler 16) to absorb the energy.

Liquid has a relatively high density and high thermal mass compared to gas or vapor (or vacuum). Consequently, the rate of thermal dissipation from the sensor 14 will be greater if liquid is in contact with the conductive pathway to the sensor (filler 14) than if gas or vapor (or vacuum) is in contact with that pathway. As will be appreciated, in the case of sensor 14 being a diode, the energy-dissipation rate will affect the temperature of the diode, which in turn will affect the voltage measured for the diode. Therefore, measuring the voltage of a diode used as the sensor 14 provides an indication of temperature. Measuring that voltage continuously or at selected intervals provides an indication of thermal-dissipation rate, which can be correlated to whether liquid is or is not in thermal contact (e.g. via a conductive pathway, such as via the exposed portion 36 of filler 16) with the diode.

One concern regarding the use of diodes or other sensors 14 for detecting the presence of liquid, and therefore, the location of a vapor-liquid interface in a container 100 (such as a storage vessel or tank), is that liquid droplets may adhere to the sensor 14 due to surface-tension or other effects even after the bulk liquid phase is no longer in contact with the sensor 14. Splashing and sloshing of liquid within a closed vessel 100 provides an additional way in which a sensor 14 may provide a false-positive indication that the probe 10 is submerged in a liquid phase. Positioning the sensor in or recessed beneath a curved surface, such as outer surface 22, whose radius of curvature increases in a direction remote from the sensor location tends to reduce the incidence of false-positive readings of liquid immersion/contact of the sensor assembly 10. Specifically, due to surface-tension effects, a droplet of liquid initially adhered to the low-radius region of the surface 22 will tend to migrate toward a higher radius of curvature along the surface 22. Therefore, by placing the sensor 14 in or at a low-radius region of a surface relative to another region remote from the sensor location, the incidence of false-positive liquid contact readings is reduced, because liquid droplets will tend to migrate away from the location where the sensor 14 is positioned.

In case of a cone-shaped main body 12, the first opening 28 in the outer surface 22 of the cone preferably is located near or adjacent its tip 20 (distant from the base 18). The first opening provides a pathway for thermal communication between a sensor 14 mounted within the main body 12 adjacent said opening 28 but recessed from the surface 22, e.g. via a filler 16 that can be used to fill the opening 28. The first opening 28 can be of any suitable size for accommodating the diode 14 and filler 16.

As an alternative to the structure illustrated in FIG. 1A wherein the main body 12 is provided with a bore 26 to accommodate the wires 34 leading from the sensor 14, the main body 12 can instead be molded around the sensor 14. In this embodiment, the sensor 14 can be placed in a mold for that body (e.g., an injection mold), in an appropriate fixture to fix the position of the sensor 14 relative to the body 12 to be molded around it. The wires 34 leading from the sensor 14 can extend through the solid interior of the main body 12 to emerge out of its base 18 (e.g. in the case of a cone) or at another location that can be selected. This mold-in methodology can be used whether the sensor 14 is itself to be formed to provide continuity with the outer curved surface of the main body 12, or if a conductive plug or filler 16 is to be positioned over the sensor via an opening 28. In the latter case, the mold can include fixturing to hold both the sensor 14 and the conductive plug or filler 16 in place. When the main body 12 is molded over the sensor 14 and filler 16, the filler 16 is in contact with the sensor 14, and the upper surface or the exposed portion 36 of the filler 16 provides continuity with the curved outer surface 22 of the main body 12.

The main body 12 is made of material that is non-conductive so that it will exhibit low thermal mass as described above, such that thermal energy travels between the sensor 14 and the environment primarily through the conductive filler 16 while heat dissipation to other parts of or through the main body 12 is limited and preferably minimized. The main body 12 also exhibits low or negligible electrical conductivity. The main body 12 may be, for example, made of Torlon™, which is moldable polyamide-imide polymer that has a thermal conductivity of about 0.5 W/m-K. Torlon™ polymers are available from Solvay Advanced Polymers. The filler 16 may be, for example, Ostalloy™ 158, which is a conductive solder material having a thermal conductivity of or about 18.6 W/m-K. Ostalloy products are available from Dieco.

Using a compact design and light materials of construction gives the liquid-sensing probe a low mass, which can be desirable in spaceflight systems. Low mass can be associated with low thermal mass, which can reduce the impact the sensor assembly 10 has on the operating system, such as lower boil-off due to the sensor assembly 10 in the case of cryogens.

Figure 4A:
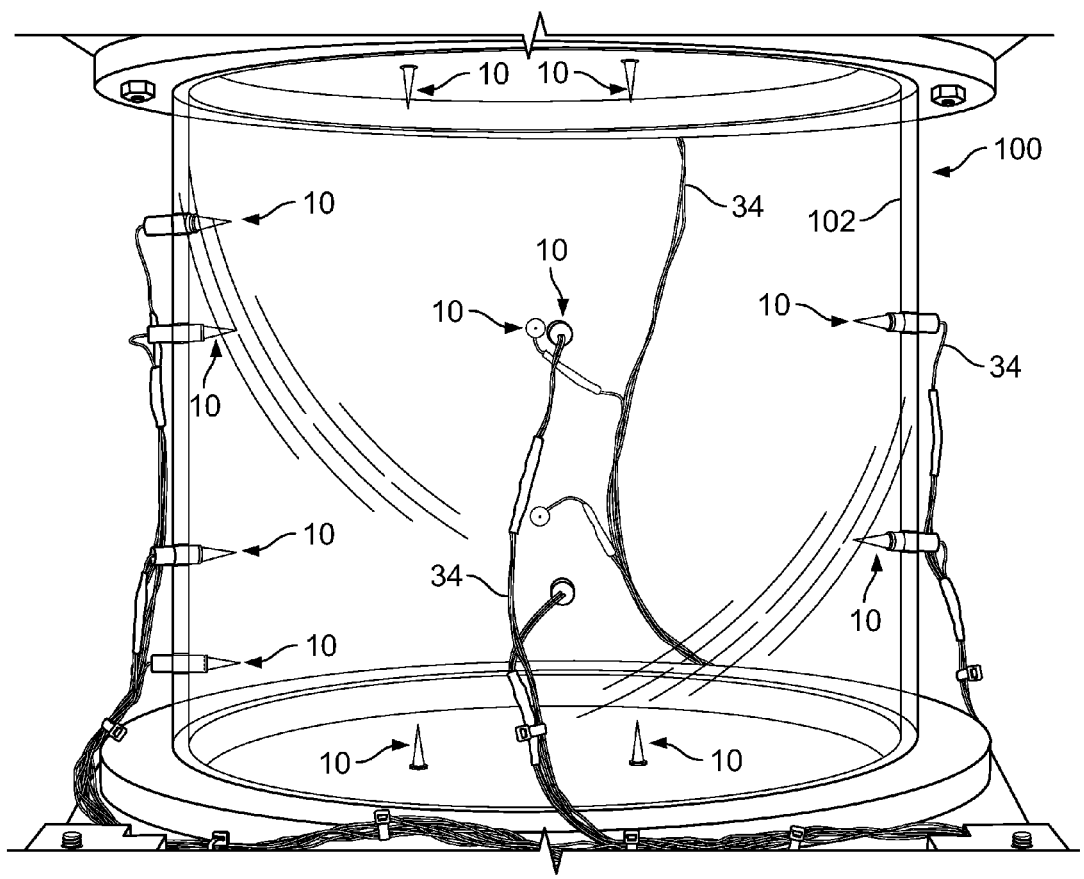
FIG. 4A illustrates a container along walls of which a plurality of sensor assemblies are mounted.

The sensor assembly 10 may be mounted to a wall-like structure, such as along an interior wall 102 of a container or tank 100 such as a storage vessel (FIG. 4A). Alternatively, the sensor assembly 10 (or a plurality of them) can be disposed (e.g. at spaced intervals) on or integrated with a support strip 40 to form a temperature- or liquid-sensing probe. The strip 40 carries electrical conductors for transmitting signals to and from the sensor(s) 14 via wires 34. In the latter embodiment, the support strip 40 can be disposed or suspended along a desired path inside the container 100 (FIG. 4B) to detect the presence of liquid therein, or the location of a gas-liquid interface.

FIG. 4A shows a plurality of sensor assemblies 10 mounted at equal or variable intervals along the interior walls 102 of a container 100. In this embodiment, the sensor assemblies 10 are mounted through the wall of the container 100, which may be permissible in certain low-pressure applications. However, in high-pressure applications where numerous penetrations through the container would be ill-advised, or in cryogenic applications where each such penetration will provide another pathway for heat-leak into the container (which can accelerate boil-off), fully internal mounting will be preferred. In such situations, the embodiment illustrated in FIG. 4B will be preferred, wherein one or a plurality of sensor assemblies 10 is/are mounted along the length of a strip 40, that can be suspended within the tank 100 as mentioned above.

Returning to FIG. 4A, the sensor assemblies 10 can be mounted at any location at the surface of a tank 100 in whose proximity it is desired to detect the presence of liquid. In operation, current can be passed through the sensor 14 (e.g. diode) to detect the environment temperature or whether that environment consists of liquid or vapor. The low current requirement of the sensor assembly 10 can be desirable, for example, in cryogenic applications because lower current reduces the amount of boil-off. The liquid-sensing probe shape, for example a cone, is effective at removing or wicking liquid drops or films from the location of the assembly where the diode is located, which prevents or inhibits their accumulating or building up over or adjacent the diode 14 location, e.g. in low gravity environments.

An example of multiple sensor assemblies 10 mounted in a tank 100 along its wall can be seen in FIG. 4A. As shown, the assemblies 10 can be mounted on the top surface, bottom surface and curved or flat side walls of the tank 100. As shown in FIG. 1C, the assemblies 10 may be mounted through openings in the side-wall of a cylindrical test vessel, and wires from the probes can be connected directly to a control box.

Figure 2:
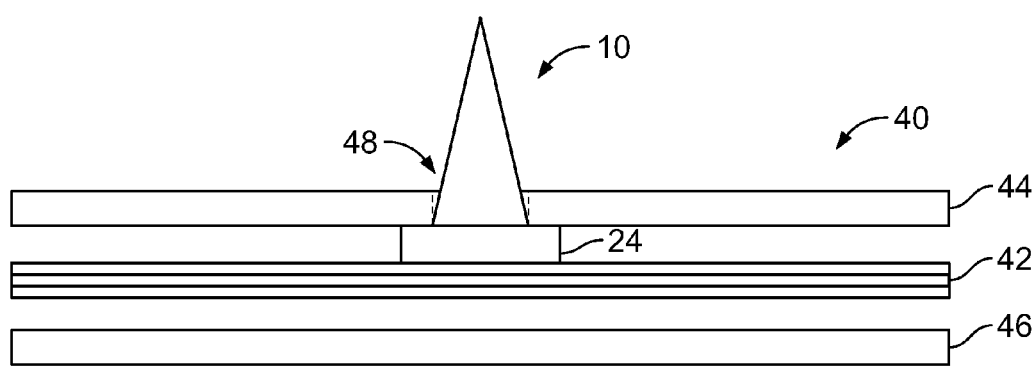
FIG. 2 illustrates a support strip on which a sensor assembly as in FIG. 1A can be mounted to form a probe.
Figure 4B:
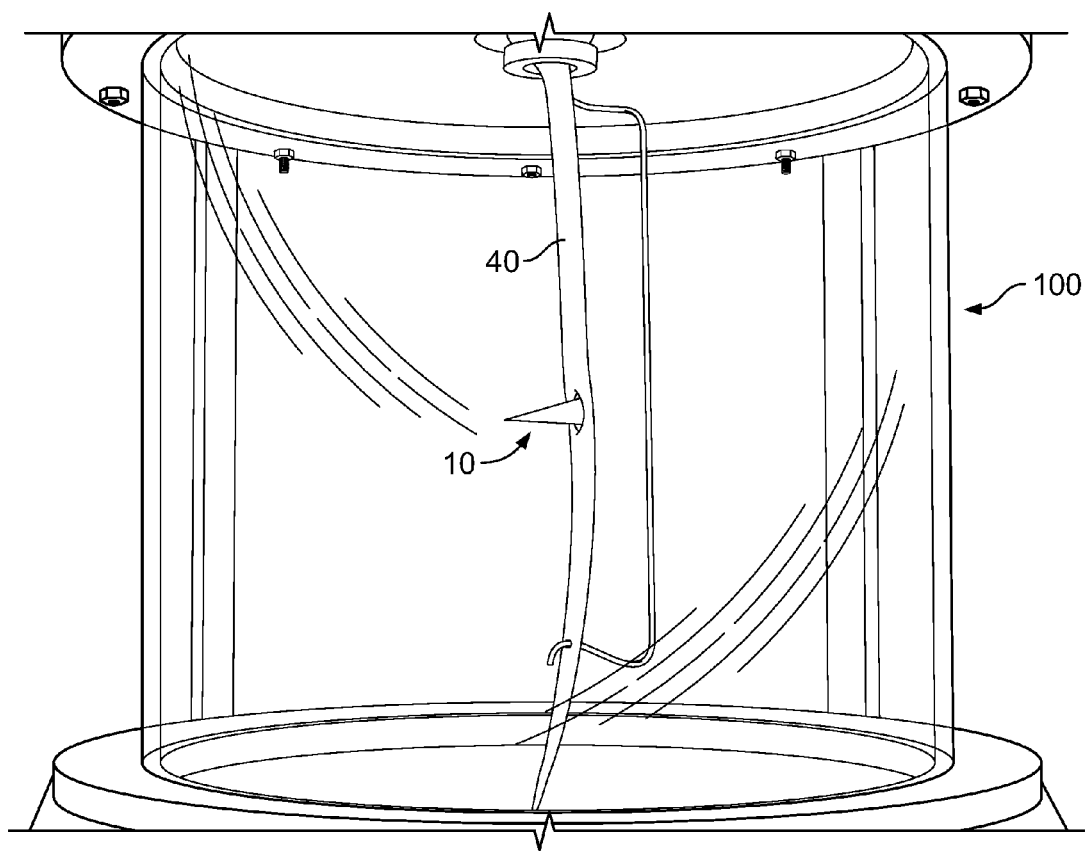
FIG. 4B is a container having probe for detecting the presence of liquid mounted or suspended therein, the probe comprising a support strip and a sensor assembly (only one is illustrated but a plurality of sensor assemblies can also be present as explained below)

Alternatively, as shown in FIG. 4B, the liquid-sensing probes can be mounted to and along the length of a flexible support strip 40 (which can be made in accordance with the method described below, as illustrated in FIG. 2) to provide a flexible temperature sensing probe similar to that disclosed in U.S. Pat. No. 6,431,750 incorporated above. While only one sensor assembly is shown on the support strip 40 in FIG. 4B, numerous such assemblies may be provided at spaced intervals along the strip's length, with their respective conductive wires communicating with discrete or isolated conductors that extend along the length of the strip for sending and receiving signals to the sensors in each respective sensor assembly 10. The sensors disposed in the sensor assemblies 10 can deliver accurate liquid and temperature detection both in gravity and microgravity environments, which can be advantageous for operational awareness, safety and efficiency. The design and flexibility of the sensor assembly 10 allows for mounting along tank walls of complex geometry. For example, mounting them along a flexible strip 40 will enable mounting such assemblies around and along wall curves.

Referring to FIG. 2, the support strip 40 with sensor assemblies 10 mounted thereto may include a circuit layer 42, a first cover layer 44 and a second cover layer 46. The layers of the support strip 40 in FIG. 2 are illustrated as separated and in exaggerated dimensions for ease of reference. In practice, the illustrated layers would be laminated to and in contact with the adjacent layer(s). The features of the sensor assembly 10 are omitted for clarity of illustration. Both of the cover layers 42, 44 are strips of Kapton™ polyimide film (which is a dielectric material) having a layer of pressure-sensitive adhesive (such as acrylic PSA) thereon. The circuit layer 42, which is sandwiched between the first cover layer 44 and the second cover layer 46, includes a plurality of conductors in electrical communication with the sensors in the associated sensor assemblies 10 mounted along the strip's length via wires 34 for each sensor assembly 10. The circuit layer 42 has conductive strips or traces etched thereon or therein, forming said conductors. These strips or traces can be used to carry electrical signals, and power, to/from the sensors (e.g. diodes) in the sensor assemblies 10 disposed along the length of the strip 40. For example, the lead wires 34 from one sensor 14 can be soldered to selected ones of the traces on the circuit layer 42. Separately, the sensor wires 34 for detecting voltage changes can be soldered to different selected ones of the traces on the circuit layer 42. These traces then carry current or voltage signals to/from the sensor 14 in each sensor assembly 10. These one or more conductors connect each sensor 14 with the processing apparatus 32 and a voltage source (not shown). Such a circuit layer 42 possessing numerous conductors as described above can have numerous sub-layers (e.g. alternating conductive and insulative layers, as well as numerous conductive strips etched in parallel along a common insulative layer, or it may comprise combinations of these. Such circuit layers are known in the art and their manufacture will not be further described here, except to reference the aforementioned U.S. Pat. No. 6,431,750, which describes such a circuit layer possessing multiple conductors for carrying signals/current to/from a plurality of sensors disposed along its length.

Returning to FIG. 2, the sensor assembly 10 is mounted above the circuit layer 42 and the first cover layer 44 includes an aperture 48 through which the main body 12 of the sensor assembly 10 can extend. The aperture 48, however, is sized to prevent the flange 24 from passing through. Thus, the flange 24 is secured between the first cover layer 44 and the circuit layer 42. Each of the first cover layer 44 and the second cover layer 46 is applied with the pressure-sensitive adhesive (PSA), such as acrylic PSA, on the respective side facing the circuit layer 42 such that the support strip 40 can be assembled into one cohesive strip comprising the plurality of aforementioned layers. A plurality of sensor assemblies 10 may be mounted in this manner on the support strip 40 at equal or varying intervals as noted above.

The support strip 40 provides at least two functions. First, it conducts current and voltage signals to/from each sensor assembly 10 that is incorporated along its length as explained above. Second, the support strip 40 provides means to position the sensor assemblies 10 incorporated along the strip's length, at strategic locations within a liquid storage vessel or other container to detect the presence of liquid. For example, the strip 40 can be fastened into place along an interior wall of the storage vessel, or it can be suspended between two distant points such that the strip 40 (and the sensor assemblies 10 incorporated along its length) extend(s) across a dimension of the interior volume of the storage vessel to detect the presence of liquid at multiple discrete locations.

Figure 3:
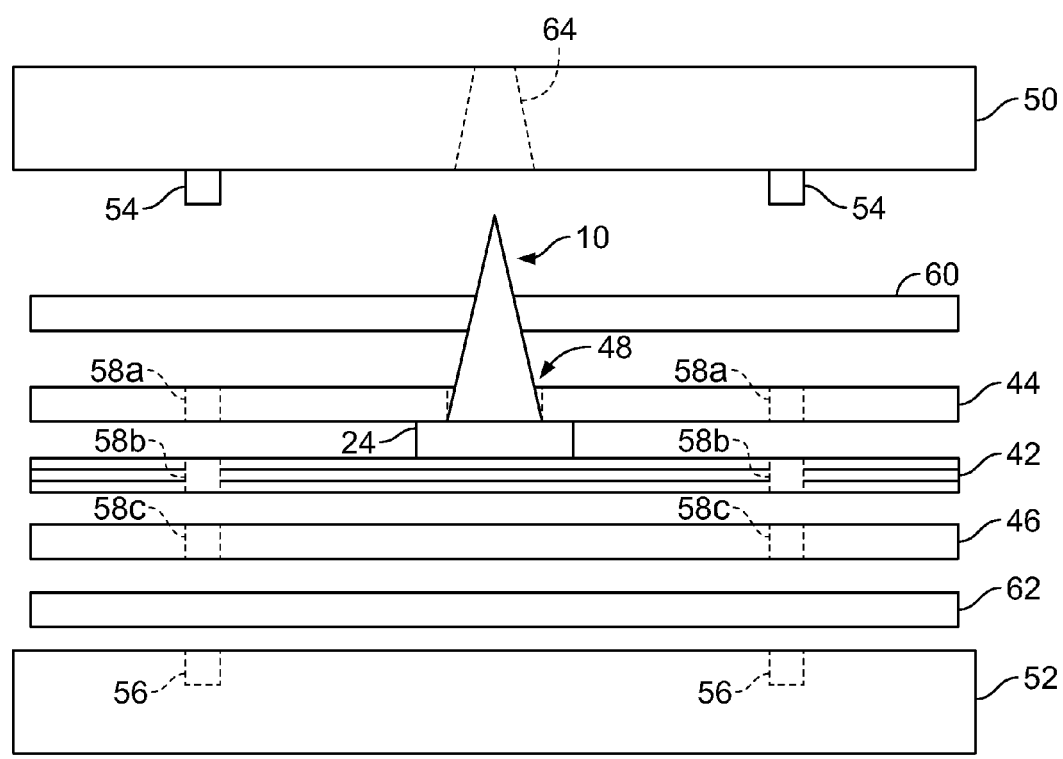
FIG. 3 illustrates a system for manufacturing the support strip of FIG. 2.

Referring to FIG. 3, the support strip 40 may be assembled using a press machine, which may include a first press plate 50 and a second press plate 52. One of the press plates 50, 52 includes a complementary bore 64 that is shaped to accommodate the main body 12 of the sensor assembly 10. Moreover, one of the press plates 50, 52 may include alignment pins 54 while the other of the press plates 50, 52 may include pin sockets 56 for receiving the alignment pins 54. In case the alignment pins 54 and the pin sockets 56 are provided on the press plates 50, 52, the first cover layer 44, the circuit layer 42, and the second cover layer 46 are provided with a first set of pin holes 58a, a second set of pin holes 58b, and a third set of pin holes 58c allowing the alignment pins 54 to pass through the layers 42, 44, 46 and into the pin sockets 56 during the pressing step. The press machine may include a mechanism for aligning the pin holes of the first cover layer 44, the second cover layer 46 and the circuit layer 42 prior to the pressing step.

The complementary bore 64 of the first press plate 50 allows pressure to be applied to the sensor assembly 10 during the pressing step so as to prevent the PSA from becoming accumulated underneath the sensor assembly 10. The accumulation of excess PSA beneath the sensor assembly 10 can cause the flange to snap and damage or destroy the sensor assembly 10.

Moreover, in order to help uniform application of pressure during the pressing step, additional layers or materials may be included during the pressing step. A conformance layer 60 (which may include a layer of fabric or cotton-like material, a polymer layer and a layer of polytetrafluoroethylene (PTFE)), may be disposed between the first press plate 50 and the first cover layer 44. The conformance layer 60 can dampen localized, elevated pressures caused by non-uniformities of more rigid layers and can aid in the even application of pressure during the pressure step. The conformance layer 60 is a sacrificial layer which may be discarded after the pressing step.

Placing a similar conformance layer 60 between the second cover layer 46 and the second press plate 52 has been shown to cause deformation of the circuit layer 42. This problem has been overcome by instead using only a layer of PTFE 62 alone, which is sufficient to achieve uniformity of pressure application. This PTFE layer 62 can also be discarded after the pressing step.

The sensor 14 can be used as a temperature measuring device because the voltage drop across the sensor 14 will vary as a function of temperature. When the sensor assembly 10 is thermally exposed to a predetermined space that the sensor 14 is intended to examine (e.g., an interior of a container 100) and a current is applied to the sensor 14, the contents inside the container 100 located immediately adjacent the sensor assembly 10, or in contact therewith, affect the temperature of the sensor 14 because liquid or vapor in thermal contact with the sensor will absorb thermal energy therefrom via filler 16 (via exposed portion 36). The rate of heat dissipation from the sensor 14 will tend to be greater when the exposed portion 36 is in contact with liquid as opposed to vapor and the voltage drop of the sensor 14 will reflect the corresponding difference in heat dissipation.

Figure 5A:
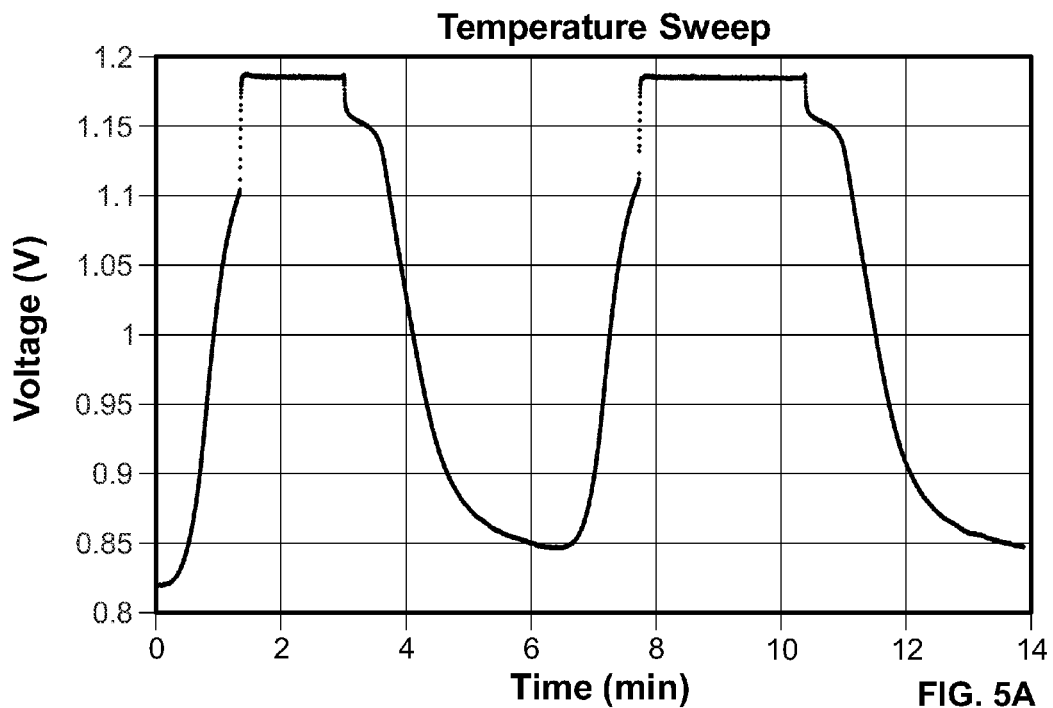
FIG. 5A-5B show, respectively, voltage as a function of time data output by a sensor as described more fully below, and the first derivative of that voltage-versus-time data.
Figure 5B:
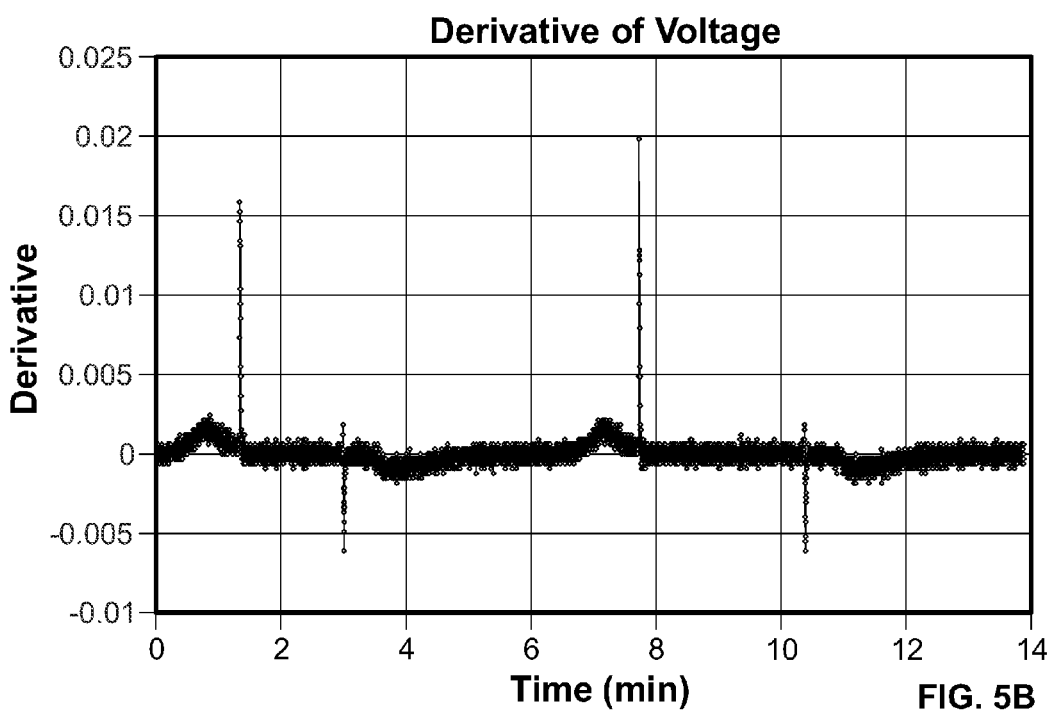

The sensor 14 can provide a voltage response as described above. The thermal energy generated from the current provided to the sensor 14 is absorbed by the probe surroundings. The voltage response can be interpreted by taking the numerical first derivative of the output voltage and comparing it to a known threshold. Two plotted examples of readings from a diode used as a sensor 14 are shown in FIGS. 5A and 5B. The experiment that produced the data in FIGS. 5A and 5B did not utilize sensor assemblies 10 having non-conductive main bodies 12 as described above for mounting the diodes. Instead, the diodes 14 were mounted directly in the support strip 40 as described in U.S. Pat. No. 6,431,750 incorporated above. The below discussion demonstrates the effectiveness of using the first derivative (FIG. 5B) of the voltage plot (FIG. 5A) for determining the incidence of a phase transition (liquid to vapor or vice versa), which will be equally applicable using a liquid-sensing probe having the structure discussed above and illustrated in FIGS. 1A-1C.

FIG. 5A shows the voltage change of the diode as the diode 14 experienced two sequences of vapor-to-liquid transition and liquid-to-vapor transition. FIG. 5B shows the first derivative of the voltage change during the same time span. A positive peak indicates a vapor-to-liquid transition and a negative value indicates a liquid-to-vapor transition. In other words, the first derivative of voltage drop across a power-dissipative element can be used to detect liquid-vapor interfaces.

The significant voltage change associated with the sweep shown in FIG. 5A does not create peaks in the first derivative as shown in FIG. 5B, but the phase transitions can. The absolute value (magnitude) of each of the peaks is above a threshold that can be selected, which threshold is set so as to be a desired magnitude above a baseline of other data points in the set. According to the desired method, whenever the magnitude of the first-derivative of voltage change (based on voltage-versus-time data) for the diode exceeds the threshold, a transition across the liquid-vapor interface in the associated container adjacent the diode is recorded. The function of this method is to determine liquid-vapor interface crossings using diode voltage drop data. The method of detecting the liquid-vapor interface is performed by multiple functions. A numerical first derivative of the voltage data is calculated. The calculated value can be compared with a threshold value, which can be set by the user. If the first derivative is greater than the threshold value, then the transition is recorded. The calculations and comparisons can be implemented into a computer algorithm. Nominal input is data giving the voltage drop across a silicon diode with 10 mA or greater (e.g. 30 mA) constant current. The method in algorithm form will perform its calculation and comparison, outputting information on the presence or absence of liquid at the location of the sensor. Such an algorithm can provide instructions to a computer to carry out the first-derivative calculation based on voltage-versus-time data from the diode, and to record vapor-to-liquid or liquid-to-vapor transitions based on correlated peaks in the first derivative greater in magnitude than the selected threshold. The computer can also store information relating to the recorded transitions in a memory. Alternatively or in addition, the computer can output such information to a medium, for example to a video display monitor, to a printer for printing the information in tabular, graphic or some other form, or to some other storage device, such as a computer disk (such as an optical disk, flash memory or internal or external hard drive) from which the information can be accessed or viewed.

While the foregoing description has been given with respect to detecting a voltage signal from a sensor and taking the first derivative of the voltage-per-time curve for the sensor to correlate peaks in that curve to a phase transition, it is to be noted that the method will be equally applicable to other signals or signal-types that may be transmitted by or measured for a sensor, wherein the signal correlates to the temperature of the sensor or the rate at which thermal energy dissipates from the sensor. Alternatively, the signal can relate to a physical or other electrical characteristic of the sensor that can be detected and measured remotely, wherein the physical or electrical characteristic correlates to whether a vapor or liquid is in contact (physical or thermal) with the sensor. For example, such a physical or electrical characteristic can relate to the rate at which thermal energy dissipates from the sensor. When the sensor is in thermal contact with a relatively large thermal mass (e.g. a liquid), the rate of dissipation will be greater than when the sensor is in contact with a lower thermal mass (e.g. vapor/gas). Voltage is one example of a variable electrical characteristic of a sensor, e.g. a diode, that correlates the sensor's temperature, which in turn correlates to the rate at which thermal energy is conducted away therefrom into a heat sink of either large (liquid) or small (vapor/gas) thermal mass. By detecting the time-dependent voltage of the sensor and calculating the first derivative of the resulting curve as explained above, peaks in the corresponding first-derivative curve can be correlated to a phase transition in the predetermined space (location of the heat sink—liquid or vapor/gas). Other exemplary electrical characteristics that may be detected as a signal from the sensor and similarly correlated include resistance, impedance, capacitance (e.g. in the case of a capacitor), conductivity, current draw, etc. Alternatively, any of the foregoing electrical characteristics can be calculated from another signal type and used to perform the first-derivative calculation to correlate peaks with phase transitions.

Compared to existing liquid-vapor interface detection methods, the described method has lower response times, which can be desirable in applications where high-fidelity information is required such as computational fluid dynamics model verification. The described method has low susceptibility to error from changes in temperature. This is well evidenced by FIGS. 5A and 5B, where the sensor surroundings change about (290−90=) 200 K in 2-3 minutes without indicating a change of state. This is an advantage because pressure changes in a tank lead to saturation temperature change, which in turn causes equilibrium diode voltage to change. For a threshold method that detects absolute voltage fluctuations (as opposed to their first derivatives) compared to a pre-determined threshold value, this temperature change can be troublesome, moving the voltage with respect to the threshold which was set. In the described method that instead compares the first derivative to a pre-selected first-derivative threshold value, error resulting from temperature drift or fluctuation resulting from differences in vapor pressure and saturation temperature is minimized.

Example

Flight testing of sensor assemblies embodied in the figures herein was conducted to determine sensor performance in a reduced-gravity environment. Flight test objectives were established to investigate two key design features of the sensors: 1) sufficient exposure of the sensing element to the fluid for good measurements and 2) a low profile smooth sensor that does not impede liquid motion along the outer surface of the sensor body. The flight test objectives could be summarized as: 1) to obtain reduced gravity sensor data under reduced gravity conditions and 2) to observe fluid motion with respect to the sensor in reduced gravity. Another objective was to determine the response time of sensors in reduced gravity. Visual data of the liquid-to-vapor and vapor-to-liquid transitions and corresponding sensor data were required to obtain the necessary information. Moreover, using a tank instrumented with reduced-gravity liquid sensors at various locations on the tank wall, the sensors measured when the liquid-vapor interface at the tank wall crosses the point where the sensor is located. Sensor performance could be evaluated by comparing the number and timing of transitions a sensor actually underwent, as judged by visual data, with the number and timing of transitions indicated by the sensor.

Two test tanks similar to FIGS. 4A and 4B were used in the flight experiment. Test Tank A contained fourteen reduced-gravity sensors embedded into the tank wall (similarly to FIG. 4A) while Test Tank B contained a single sensor embedded on a support strip and a probe guide to maintain sensor orientation during reduced gravity periods (similarly to FIG. 4B). The aircraft executed forty "zero-g" reduced-gravity parabolas on each of two days, and each parabola afforded about twenty-five seconds of reduced gravity. The two test tanks were mounted in a test package which was bolted to the floor of the aircraft. A single video camera was focused on the reduced gravity sensor probe in Tank B and recorded visual data to satisfy the second test objective. Tank A was continuously monitored from three viewing angles, with three different cameras operating in rapid still-frame mode. For testing, one-third of each of the tank volumes was filled with water. The water was dyed blue to allow for ease of identification in video data. The dye had negligible effects on the liquid properties.

Each reduced gravity sensor was powered by an electronics box made for the purpose of liquid level and temperature sensing. A computer held within the electronics enclosure provided power to the sensors and collected the associated sensor data. The computer recorded the still images created by the cameras attached to Tank A. The camera attached to Tank B had its own power and recording media.

G-force data was measured and recorded on all test flights. The data was indexed according to each parabola number. The g-force data was used to estimate the Bond number for each experiment. Using density and surface tension values at 25° C. for water, Weber and Bond numbers for the experiment were estimated to approximate the flow regime witnessed in the video. Flow velocity was determined by assessing interface motion over known distances and known time intervals, using the visual data. Aircraft acceleration levels were provided by sensors on the aircraft and used to determined Bond numbers. It was found that the bulk fluid Bond number, based on the radius of the tank, was between 0 and 30, and did not reach the level needed for capillary dominated flow. Weber numbers in the bulk fluid were also estimated to have ranged from 0 to 30. Thus, both dimensionless quantities were out of the required range (<1) in the bulk fluid. However, the smaller dimension and characteristic length of the reduced-gravity sensor allowed a reduction in the local Bond number calculation for any drops on the sensor surface. Because of this, small droplets were believed to have been in the capillary-dominated flow regime. Instances of small liquid drops contacting the sensor surface did occur and provided conditions for the reduced-gravity sensors to act in their design condition.

Conditions did exist for capillary-dominated flow where small droplets did cling to solid surfaces. A small amount of liquid clinging to a flat part of the support strip (FIG. 4B) was observed during a period of two seconds. If a standard liquid-vapor detection sensing element was present at this point in the probe, it would indicate liquid, and this would constitute an error in the bulk liquid-level measurement. It was observed that liquid drop remained on the probe while the bulk fluid motion moved over the reduced-gravity sensor, leaving it dry. The difference in these behaviors showed the effect of the reduced-gravity sensor and illustrated how liquid behavior on the reduced-gravity sensor translated into improved measurement accuracy. The reduced-gravity sensor contributed to migration of liquid towards the base of the cone-shaped main body of the sensor assembly and away from the region where conductive filler was exposed at the surface (near the tip of the cone) to provide thermal communication between the subjacent sensor and the exterior environment. Response times could not be found from reduced-gravity testing due to data recording problems.

In Tank A, the number of transitions from vapor-to-liquid, number of transitions from liquid-to-vapor, and number of transitions seen in visual data but not in sensor data were counted. Of the 44 transitions undergone by all sensors, one was not registered by the sensor.

The following conclusions have been drawn from the testing. First, the conditions of the flight were generally not conducive for the collection of pertinent data. The unexpectedly high accelerations and initial flows gave bulk fluid motion, which was not capillary-dominated flow. Locally, there were some instances of the desired capillary flow appearing near the sensors, which did allow for validation of the sensor design. An experimental test package, which is capable of actively countering the aircraft acceleration excursions and can lower the local Bond numbers further, is desirable. Second, video evidence suggests that the reduced-gravity sensor geometry will increase sensing accuracy in the reduced-gravity environment by getting readings of the bulk state rather than of films or droplets. Third, although most of the data indicated nominal performance of the sensors, some transitions that were missed are believed to be a result of too-high surface roughness on the outer surface of the sensor assembly, which would impede capillary flow over the surface. Fourth, visual data was difficult to interpret. An improvement in flight test setup based on the flight experience will allow for more accurate and efficient interpretation of the visual verification. Fifth, laboratory data showed that the new liquid-vapor detection algorithm (i.e. calculating the first derivative of the time-dependent voltage data and correlating peaks in the first-derivative curve with phase transitions) used in this project showed fast response (<0.3 s) and is insusceptible to error from fluid media temperature changes.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A sensor assembly comprising:
    a main body comprising an outer surface, at least a portion of which is curved such that its radius of curvature increases continuously from a first location on said outer surface to a second location on said outer surface;
    a sensor recessed in said main body beneath said outer surface; and
    a conductive pathway between said sensor and an environment outside said main body adjacent said first location, said conductive pathway having a thermal conductivity greater than the thermal conductivity of said main body.

2. The sensor assembly of claim 1, said conductive pathway having a thermal conductivity at least one order of magnitude greater than the thermal conductivity of said main body.

3. The sensor assembly of claim 1, said main body having a thermal conductivity not more than 2 W/m-K, said conductive pathway having a thermal conductivity of at least 14 W/m-K.

4. The sensor assembly of claim 1, said main body having a thermal conductivity not more than 1 W/m-K, said conductive pathway having a thermal conductivity of at least 18 W/m-K.

5. The sensor assembly of claim 1, said outer surface being conical such that its radius of curvature in a direction normal to an axis of symmetry of said conical surface increases continuously in a longitudinal direction from a first end thereof to a second end thereof.

6. The sensor assembly of claim 5, further comprising an opening in said outer surface at said first location adjacent said first end, and a conductive filler in thermal contact with said sensor, said conductive filler providing said conductive pathway via said opening.

7. The sensor assembly of claim 6, said conductive filler filling said opening such that an exposed portion of said filler has a continuous contour with, and matches the curvature of, said outer surface.

8. The sensor assembly of claim 7, said exposed portion of said filler being substantially seamless with said outer surface adjacent said opening.

9. The sensor assembly of claim 5, said conductive pathway having a thermal conductivity at least one order of magnitude greater than the thermal conductivity of said main body.

10. The sensor assembly of claim 5, said main body having a thermal conductivity not more than 2 W/m-K, said conductive pathway having a thermal conductivity of at least 14 W/m-K.

11. The sensor assembly of claim 5, said conical outer surface having a cone angle not more than 20°.

12. The sensor assembly of claim 1, said main body comprising polyamide-imide polymer having a thermal conductivity of about 0.5 W/m-K.

13. The sensor assembly of claim 1, said outer surface being entirely curved.

14. The sensor assembly of claim 1, said sensor comprising a diode.

15. A probe comprising a support strip having at least one conductor extending therein along the probe's length, and a sensor assembly as in claim 1, the sensor in said sensor assembly being in electrical communication with said at least one conductor for conducting signals to and/or from said sensor.

16. The probe of claim 15:

the main body of said sensor assembly further comprising a flange at an end thereof, and said support strip comprising a first cover layer, a second cover layer and a circuit layer sandwiched therebetween, said circuit layer comprising said conductor, said first cover layer having an aperture through which the main body of said sensor assembly extends and which is sized to prevent the flange from passing therethrough, said flange being sandwiched between said circuit layer and said first cover layer adjacent said aperture.

17. The probe of claim 16, comprising a plurality of said sensor assemblies disposed along the length of said support strip, having respective main bodies extending through respective apertures in said first cover layer, their respective flanges being sandwiched between said circuit layer and said first cover layer, said circuit layer comprising a plurality of conductors extending along the strip's length and in electrical communication with respective sensors in said plurality of sensor assemblies.

18. The probe of claim 16, said conductive pathway having a thermal conductivity at least one order of magnitude greater than the thermal conductivity of said main body.

19. The probe of claim 16, the outer surface of said main body being conical such that its radius of curvature in a direction normal to an axis of symmetry of said conical surface increases continuously in a longitudinal direction from a first end thereof to a second end thereof.

20. The probe of claim 19, said flange being located at said second end.

21. The probe of claim 19, further comprising an opening in said outer surface adjacent said first end, and a conductive filler in thermal contact with said sensor, said conductive filler providing said conductive pathway via said opening.

22. The probe of claim 21, said conductive filler filling said opening such that an exposed portion of said filler has a continuous contour with, and matches the curvature of, said outer surface.

23. A method of detecting whether liquid is present in a predetermined space, comprising the steps of:

exposing the main body of the sensor assembly of claim 1 to said predetermined space;

applying a current to the sensor in said sensor assembly to generate heat at the sensor, wherein heat generated at said sensor is dissipated via the conductive pathway in said sensor assembly to the predetermined space; and detecting the voltage drop across said sensor as a function of time and correlating voltage drop-versus-time data for said sensor with the rate of dissipation of said heat to determine the presence or absence of liquid in the predetermined space.

24. The method of claim 23, said predetermined space being in a reduced-gravity environment.

25. The method of claim 23, said predetermined space being a location inside a storage vessel in a reduced-gravity environment, wherein the liquid whose presence or absence is detected is a cryogenic liquid within said storage vessel.

26. The method of claim 23, further comprising determining a transition from liquid-to-vapor or vapor-to-liquid by calculating a first derivative of the voltage drop across said sensor as a function of time, and correlating a peak in said first derivative with said transition.

27. The method of claim 26, further comprising operating a computer according to an algorithm so that said computer carries out said first-derivative calculation based on voltage-versus-time data from said sensor, and records vapor-to-liquid or liquid-to-vapor transitions based on correlated peaks in said first derivative, said computer storing information related to said transitions in a memory and/or outputting said information to a medium.

* * * * *